SCANNING SYSTEM FOR COLOR DISPLAYS

Filed June 26, 1967 4 Sheets-Sheet 1

3,541,236
SCANNING SYSTEM FOR COLOR DISPLAYS

George E. Goode, Richardson, Tex., assignor to Texas Instruments Incorporated, Dallas, Tex., a corporation of Delaware Filed June 26, 1967, Ser. No. 648,563
Int. Cl. H04n 9/12
U.S. Cl. 178—5.4 12 Claims

ABSTRACT OF THE DISCLOSURE

A line-sequential color display system is disclosed in which the objectionable lined quality usually associated with such sequential displays is reduced by superimposing an alternation or interlacing of dots of light of different colors in the same line on successive fields.

This invention relates to a color display system and more particularly to a line-sequential color display system.

Various kinescope color display systems have been proposed in which the color of light emitted by a phosphor viewing screen is changed by varying the accelerated voltage applied to an electron beam which is scanned across the screen causing it to produce light. The accelerating voltage is typically varied by varying the potential of the viewing screen itself. Since such a viewing screen constitutes a capacitive load, the rate at which its potential may be changed is limited if power consumption is to be held within reasonable limits. It is, for example, impractical to switch the screen voltage at a high enough frequency to permit a dot-sequential color presentation, even though such a presentation is preferred from the point of view of achieving best color image resolution.

While the viewing screen potential can be switched at the usual field repetition rate, field-sequential color presentations are typically considered objectionable in that, during the display of scenes of predominately one color, the effective field repetition rate is equal only to the total field rate divided by the number of different component colors which make up the display. This effective reduction in the field rate can cause an objectionable flicker at normal field repetition rates.

In view of the problems with dot- and field-sequential presentations noted above, most color display systems employing the variable screen voltage method of color switching have been operated in a line-sequential mode. One problem associated with the line-sequential mode of display, however, is that scenes of predominately one color have an objectionable lined appearance resulting from the dark lines caused by the absence of the other colors.

Among the several objects of the present invention may be noted the provision of a line-sequential color display system in which the presented images do not have an objectionable lined quality; the provision of such a system in which the production of light of the component colors is relatively evenly distributed over a viewing screen; the provision of such a system which provides relatively high resolution; the provision of such a system which provides a pleasing color balance; and the provision of such a system which is relatively simple and inexpensive. Other objects and features will be in part apparent and in part pointed out hereinafter.

Briefly, a color display system according to the present invention is operative to produce color images from a plurality of color records corresponding to different respective hues. The system includes a viewing screen and means for scanning the screen in successive fields, each comprising a series of substantially parallel lines, to produce dots of light of a preselectable hue at a series of spaced points along each such line. Means are provided for changing the hue of the light produced on successive lines in each field and for changing the hue of each line on successive fields, the spaced dots of different hues produced on each line being alternated with each other. Means are also provided for varying the intensity of the light produced at each instant in accordance with a respective one of the records as light of each hue is produced.

The invention accordingly comprises the constructions hereinafter described, the scope of the invention being indicated in the following claims.

In the accompanying drawings in which several of various possible embodiments of the invention are illustrated, FIG. 1 is a block diagram of a two-color display system according to this invention;

Corresponding reference characters indicate corresponding parts throughout the several views of the drawings.

Figure 1:
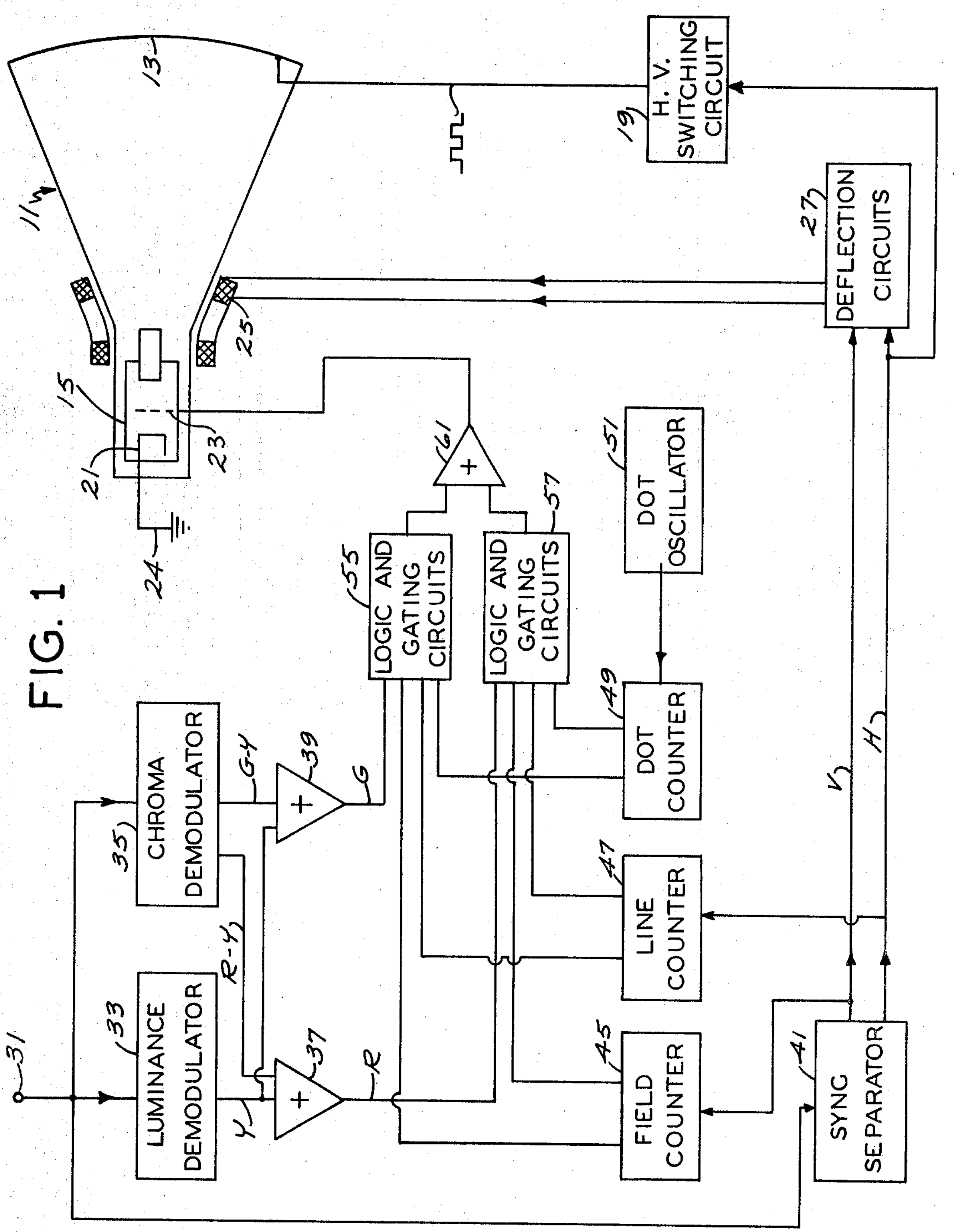

Referring now to FIG. 1, there is indicated at 11 generally a color kinescope having a phosphor viewing screen 13 and an electron gun 15 for emitting a beam of electrons directed toward the viewing screen for energizing the screen to cause it to emit light. Screen 13 includes phosphor material or materials of the type in which the hue or color of the light emitted changes as the electron accelerating voltage applied to the screen is varied. Screen 13 may, for example, comprise a mixture of a first phosphor which emits red light when struck by impinging electrons and a second phosphor which emits cyan light only when struck by electrons having energies above a predetermined threshold. Thus, when the screen is struck by electrons of relatively low energy, only red light is produced whereas when the screen is struck by electrons having energies above the aforesaid predetermined threshold, both the red and the cyan phosphors will be energized causing a relatively achromatic or white light to be produced. Screen 13 may alternatively comprise phosphors of the type disclosed in copending application Ser. No. 598,826 in which the hue of the light emitted from each phosphor particle varies as the electron energy varies.

A high voltage switching circuit indicated at 19 applies to screen 13 a voltage which alternates between a first level which causes red light to be emitted and a second level which causes white light to be emitted. The high voltage switching circuit is operated so that the different voltage levels are applied to screen 13 on successive lines in the scanning raster and, as described in greater detail hereinafter, the different voltages are applied in synchronism with the application of different color signals or records to the electron gun 15 so that each color signal causes light of respective color to be produced on the screen. Using the phosphors just described, the two colors produced are red and white. However, other colors may be used. Further, the colors produced need not correspond precisely with the wave length components or distributions which formed or defined the original records or signals which control the display. For example, it is known that the conventional NTSC red and green color records or signals may be displayed in red and white light respectively and, in the system illustrated in FIG. 1, such a mode of display is assumed.

Gun 15 includes an electron-emissive cathode 21 and a grid 23. As is understood by those skilled in the art, the beam current or number of electrons emitted by gun 15 is variable as a function of the voltage between cathode 21 and grid 23. Thus the brightness of the light generated on screen 13 in response to the electron beam emitted by gun 15 may be varied by means of a signal applied between the grid and the cathode. The cathode is grounded as indicated at 24.

The beam of electrons emitted from gun 15 passes through the influence of a substantially conventional deflection yoke 25. Yoke 25 is operated by horizontal and vertical deflection circuits indicated generally at 27 to scan the beam of electrons over screen 13 in a scanning raster which comprises a series of parallel, substantially horizontal lines.

A composite video signal, e.g., one containing both luminance and color information and also horizontal and vertical scan synchronizing pulses, is applied to a terminal indicated at 31. Circuits for forming, transmitting and receiving such video signals are well known and hence are not described herein. The composite video signal is applied to a luminance demodulator 33 which obtains therefrom the brightness or luminance signal, conventionally designated Y. The video signal is also applied to a chroma demodulator circuit 35 which operates in a known manner to provide a pair of color difference signals $R-Y$ and $G-Y$. The color difference and luminance signals are combined in a pair of summing matrices 37 and 39 to obtain, respectively, a color signal R which represents or corresponds to the red color component of the image being transmitted and a green color signal G which represents or corresponds to the green color component of the image being transmitted.

The video signal provided at terminal 31 is also applied to sync separator circuits indicated generally at 41 which are operative to provide a vertical synchronizing signal V and a horizontal synchronizing signal H. These signals are applied to the deflection circuits 27 to synchronize the scanning of the electron beam across screen 13 with the scanning pattern which produced the original video signal applied to terminal 31. The horizontal synchronizing signal H is also applied to the high voltage switching circuit 19 for causing the accelerating voltage applied to the screen 13 to change between its two levels on successive scan lines. Thus, during the scanning of each line, only light of one color is produced on the viewing screen.

The vertical and horizontal synchronization signals are applied also to respective electronic counting circuits 45 nd 47. Counting circuit 45 functions as a field counter which is advanced one step at the start of each field and circuit 47 functions as a line counter and is advanced one step at the start of each line. A third electronic counting circuit 49 is provided to define or determine the spacing of successive dots or image elements along each line. This counter is operated to count or advance under the control of a signal provided by a dot spacing oscillator circuit indicated generally at 51. The frequency of the signal provided by the oscillator circuit 51 is preselected so that, at the scanning rate employed, the oscillator signal frequency is about the same order of magnitude as the rate at which the smallest resolved image elements are scanned. This frequency is substantially above the line scanning frequency.

The red color signal R and the green color signal G are applied to respective logic and gating circuits 55 and 57. The gated color signals passed by the gating circuits 55 and 57 are combined in a summing matrix 61 and the resulting composite signal is applied to the grid 23 of the electron gun 15 thereby to modulate the electron beam current in accordance with whichever color signal (R or G) is passed at any given instant or to cut the beam off if no such signal is passed. Each of these logic and gating circuits is operative, as described hereinafter, to pass the respective color signal at respective predetermined points in the scanning raster thereby to produce corresponding dots of light on the screen 13. The points at which the different color signals are passed by their respective logic and gating circuits 55 and 57 are determined by the states of the field counter 45, the line counter 47 and the dot counter 49, the internal logic of the gating circuits 55 and 57 being chosen to provide the various patterns of color signal alternation described hereinafter. While only signal lines are shown connecting each counter to each of the gating circuits, it should be understood that these lines represent the flow of whatever information or signals are necessary to establish and logically determined the various gating functions described hereinafter and that more than one signal path will typically be necessary for this purpose.

Figure 2:
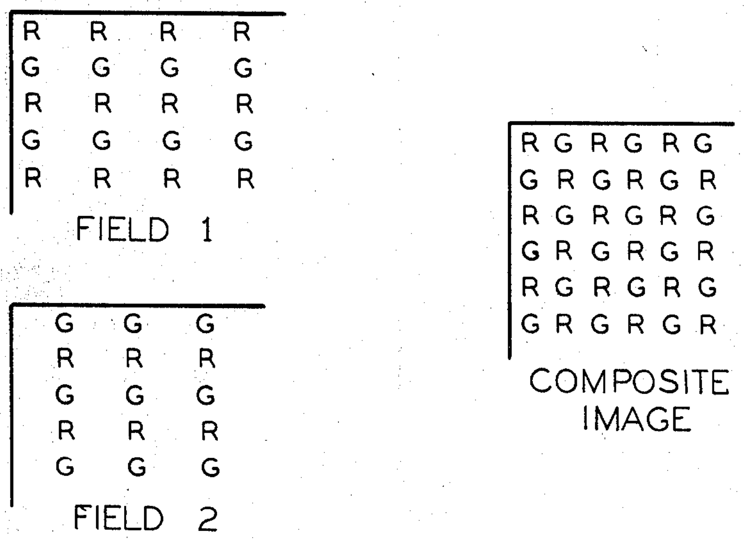
FIG. 2 is a chart indicating the order in which the system of FIG. 1 produces image components of different colors to provide a composite color image.

The logic and gating circuits 55 and 57 are arranged or programmed to provide the sequence of color signals yielding the raster patterns represented in FIG. 2. It should be noted that field interlace in the conventional sense is not employed, but instead a portion of each line is presented in each of two fields in a dot interlace fashion to form a frame. As the first line of the first field is scanned, the red color signal R is intermittently gated to the grid 23 of the gun 15 as the electron beam passes a series or succession of predetermined spaced points along that line. Further, as this first line is swept, the high voltage switching circuit 19 applies to the viewing screen 13 that voltage which causes red light to be emitted. Thus a series of red dots are produced on the screen, the brightnesses of which are controlled in response to the amplitude of the respective color signal R. During the scanning of the second line of the first field, the green signal G is passed at a succession of points along the line, which points fall directly below the points at which the red signal was passed on the previous line. During this scanning of the second line, the high voltage switching circuit 19 applies to screen 13 an accelerating voltage which causes corresponding dots of white light to be emitted, the brightnesses of which are controlled in response to the amplitude of the color signal G. The gating pattern of the first line is repeated for the third line and the gating pattern of the second line is repeated for the fourth line and so on until the scanning raster has completed the entire first field, the accelerating voltage applied during the scanning of each line being that which causes light of a color or hue corresponding to the respective color signal to be emitted.

The first line of the second field is vertically in alignment with or superimposed upon the first line of the first field and, during the scanning of this line, the green color signal G is passed at spaced points. These points, however, are shifted with respect to the points at which the red color signal R was passed during the scanning of the first line of the first field. Thus, the white dots produced on the first line of the second field will alternate with the red dots in the first line of the first field. During the scanning of the second line of the second field, the red color signal R is passed at spaced points and these points are similarly shifted with respect to the points at which the gated green signal G is passed on the second line of the first field. Thus the red dots generated on the second line of the second field will be alternated or interlaced with the white dots in the first line of the first field. At normal field repetition rates, the two fields subjectively merge into a composite image as represented at the right-hand side of FIG. 2. In this composite image the two colors are relatively evenly distributed over the image and each color appears on each line. Accordingly, the composite image has a pleasing color balance and does not appear to have an objectionable lined quality even though the component colors were generated one line at a time thereby permitting the use of a relatively simple, voltage-controlled, color-switching kinescope.

Figure 3:
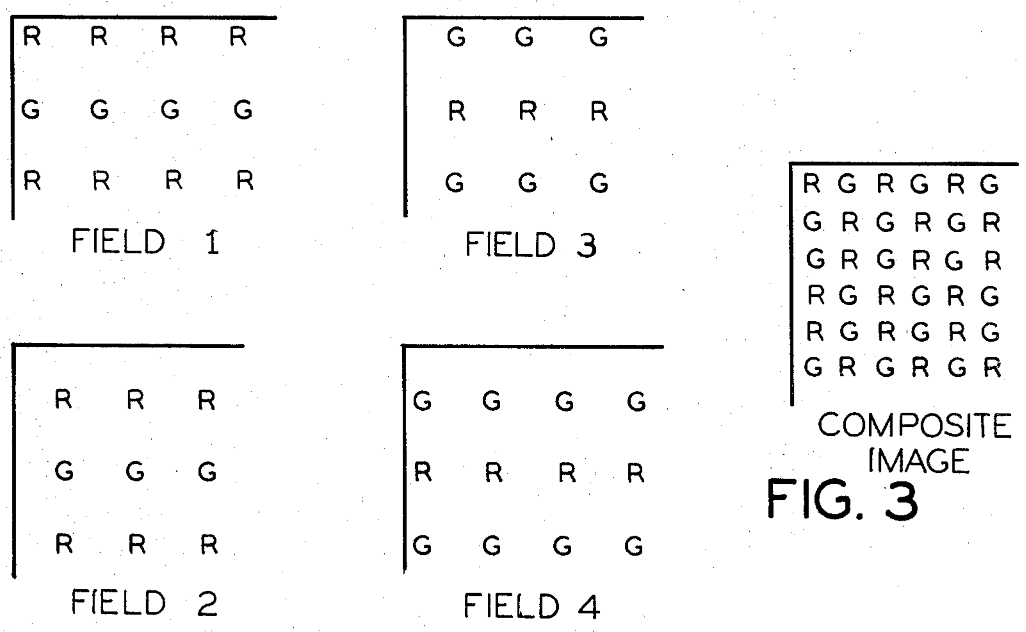
FIG. 3 is a similar chart representing a different order of presentation employing field interlacing.

The system of FIG. 1 can also be operated to provide a color display in conjunction with a transmission system which employs field interlace, e.g., the NTSC system which is standard in this ocuntry. To provide such a display, the logic and gating circuits 55 and 57 are arranged or programmed to provide the signal sequencing represented in FIG. 3. As the first line of the first field is swept, the red color signal is passed at spaced points just as in the previous example. Similarly, during the sweeping of the second line the green color signal G is passed at spaced points or intervals. This line is, however, separated from the first line by a space equal to one line-width to permit the line interlacing of alternate fields in conventional manner. The third line of the first field, which is similarly spaced from the second line, comprises a series of spaced points controlled by the red signal R.

During the scanning of the first line of the second field, the red signal is again passed at spaced points but these points are laterally offset one dot width with respect to the dots or points of the first line of the first field as well as being vertically offset due to the field interlace. The second line of the second field comprises the green signal G applied at spaced points which are laterally and vertically offset with respect to the second line of the first field. The remaining lines in the second field follow in similar fashion.

The first line of the third field is in vertical alignment with the first line of the first field but comprises the green signal G applied at spaced points rather than the red signal R and the points or dots are offset laterally with respect to the points comprising the first line of the first field. Similarly, the second and third lines of the third field are in vertical alignment with or superimposed upon the corresponding lines of the first field but the points making up each line are controlled by the opposite color signal and are laterally offset with respect to the dots in the corresponding lines of the first field. The fourth field bears essentially the same relation to the second field as the third field does to the first field, that is, the lines of the fourth field are vertically in alignment with the lines of the second field but the points or dots making up the vertically superimposed lines are controlled by opposite color signals and are laterally offset with respect to each other. The four fields just described combine to provide the composite image represented at the right-hand side of FIG. 3. As in the example of FIG. 2, each line in the composite image contains both of the component colors or hues and the light distribution of each color is relatively uniform over the composite image. Even though some points of the same color are vertically adjacent due to the field interlacing, the resultant image does not appear to have an objectionable lined or patterned quality.

Figure 4:
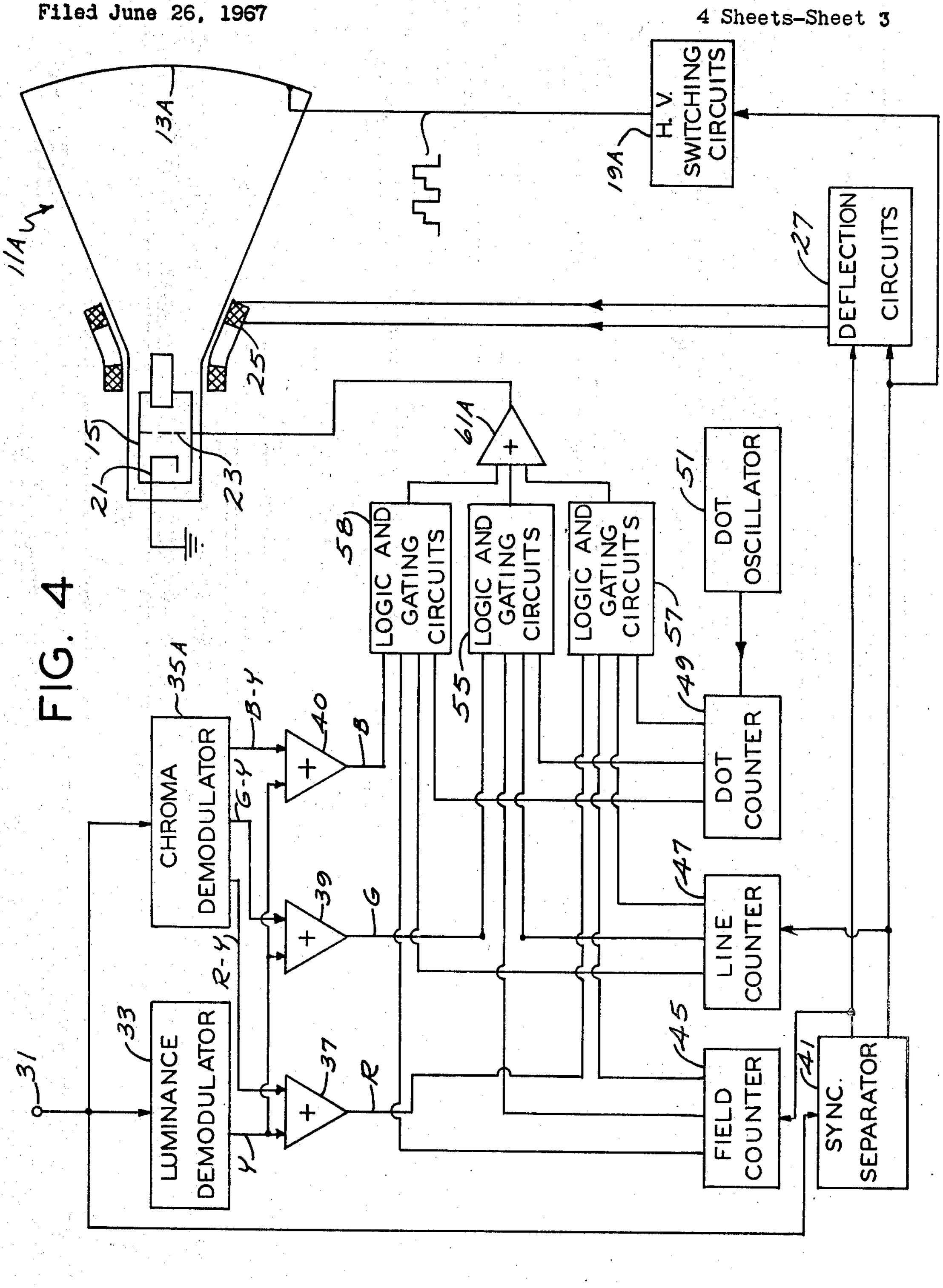
FIG. 4 is a block diagram illustrating a three-color display system according to this invention.

The system illustrated in FIG. 4 is essentially similar to that illustrated in FIG. 1 but is arranged for a three-color rather than a two-color presentation. The system includes a kinescope 11A having a screen 13A which will emit light of three different colors in response to three different accelerating voltages. A high voltage switching circuit 19A is provided which applies three different potentials to screen 13A in sequence on successive line sweeps. Screen 13A may be of the control penetration type which will emit red, green or blue light at the respective voltage leevls or may be of the type disclosed in application Ser. No. 450,705, (File 6068) in which red, green and blue phosphors are cumulatively energized at progressively higher predetermined eletcron energy levels so that red light, warm achromatic light and cool achromatic light are produced at the respective voltage levels. As in the previous example, the voltage applied to the viewing screen is switched in synchronism with the scanning raster so that each line sweep produces only light of a respective color and, as described in greater detail hereinafter, only a respective color signal is applied to the electron gun 15 during each line sweep. The FIG. 4 system includes a chroma demodulator 35A which provides not only the $R-Y$ and $G-Y$ color difference signals but also the conventional $B-Y$ signal. An additional summing matrix 40 is provided for combining the $B-Y$ signal with the luminance signal Y to obtain a color record or signal B which represents the distribution of blue light in the image being transmitted.

Respective logic and gating circuits 58 (which are essentially similar to the circuits 55 and 57 described previously) are provided for selectively passing the B signal to a summing matrix 61A for combination with the selectively gated red or green color signals, R and G respectively.

Figure 5:
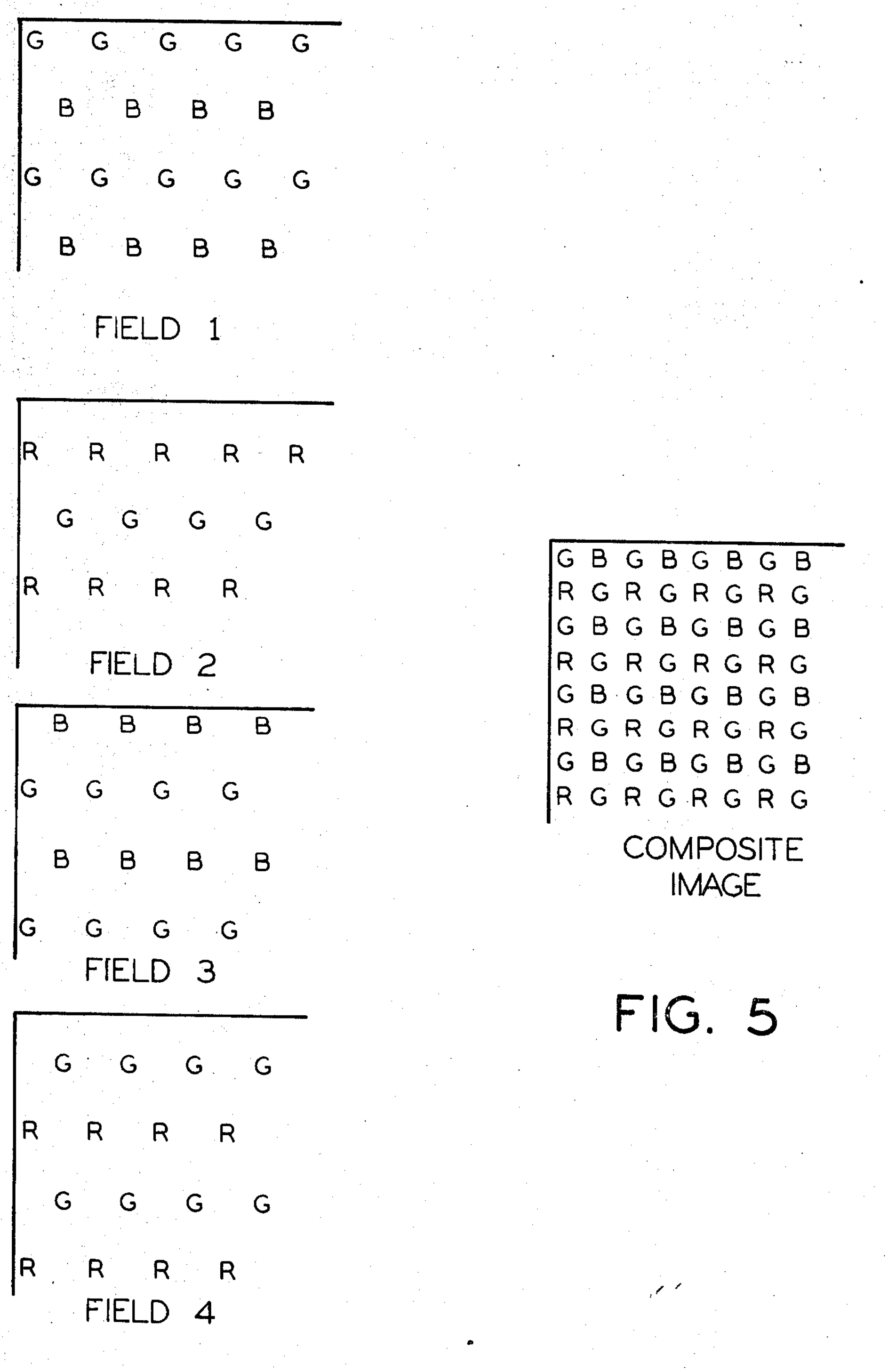
FIG. 5 is a chart representing the sequence in which different color components are produced by the system of FIG. 4.

The logic and gating circuits 55, 57 and 58 are arranged or programmed to pass the different color signals R, G and B in the pattern or sequence represented in FIG. 5. This pattern employs field interlacing and is thus compatible with NTSC broadcasts. In scanning the first field, the composite signal applied to the grid of electron gun 15 alternates between the green and blue color signal on successive lines. Each of the lines comprises a series of spaced points or dots, the brightnesses of which are controlled by the respective color signal. The dots in the alternate lines in this first field are laterally offset with respect to each other by one point or dot's width.

During the scanning of the second field, which is line interlaced with the first field, the signal which modulates the electron beam current alternates between the red color signal R and the green color signal G on successive lines. Again each line comprises a series of points or dots and the dots in alternate lines are laterally offset with respect to each other.

During the scanning of the third field the beam modulating signal again alternates between the blue color signal B and the green color signal G but, in this third field, the sequence begins with the blue and the lateral offsetting of the spaced points or dots is reversed so that the blue dots in the first line of the third field alternate with the green dots in the first line of the first field and the green dots in the second line of the third field alternate with the blue dots in the second line of the first field, etc.

Similarly, during the scanning of the fourth field the electron beam current is again modulated alternately on successive lines by the red color signal R and the green color signal G but the sequence begins with the green color signal rather than with the red color signal and the lateral offsets are complemented with respect to the second field so that dots of different color in superimposed lines are alternated with one another. The high voltage switching circuit 19A is, as described previously, synchronized with the scanning of the electron beams so that the light produced on the screen 13A in response to each of the gated signals is of a respective color.

The composite image formed by the combination of the four fields is represented at the right-hand side of FIG. 5. Each of the component colors is relatively uniformly distributed over the composite image and thus the image does not subjectively appear to have an objectionable lined or patterned quality even though the red and blue appear only on every other line in the composite image. Any residual line quality in the composite image of FIG. 5 can further be reduced by alternating the roles of the red and blue color signals on successive groups of four successive fields through the provision of additional logic and switching circuitry.

While the green color signal G controls the beam current twice as often as either of the other color signals, this characteristic of the FIG. 5 display mode is typically not objectionable since it has been found that most of the luminance information is contained in the green color signal and that therefore the overall composite image is perceived as an image of having relatively high resolution. Further, since the green color signal represents a record of the "middle" wave length components of the original image, the essential color balance of the display is not significantly disturbed. In any case, a means may be included for electronically balancing the color display, if necessary or if desired due to the asymmetry introduced by the dot interlace emphasis on green. Such balancing is a function primarily of the spectral composition of the light emitted by the impingement of electrons of various accelerating voltages upon the color phosphors used on the screen.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A color display system for producing color images from a plurality of color records corresponding to different respective hues, said system comprising:
- a viewing screen;
- means for scanning said screen to produce light of a preselected hue and intensity where scanned, the screen being scanned in at least two fields having corresponding lines with alternating dot positions on each line,
- means for changing the hue of the successive lines of the fields with the corresponding lines of the respective fields being of different hues, and
- means for varying the light intensity in accordance with a respective one of said records as light of each hue is produced.

2. A color display system as set forth in claim 1 wherein said means for scanning said screen includes an electron gun and wherein said records comprise electrical signals which are selectively applied to said gun to modulate the electron beam current.

3. A color display system as set forth in claim 2 in which said screen emits light of different hues when struck by electrons having different energies.

4. A color display system as set forth in claim 3 wherein said means for changing the hue comprises means for applying different electron accelerating voltages to said screen.

5. A color display system as set forth in claim 4 wherein said screen comprises a phosphor material which emits light of a first hue when energized by impinging electrons below first predetermined level and which emits light of a second hue when energized by impinging electrons having energies above the first predetermined level.

6. A color display system as set forth in claim 5 wherein said first hue is substantially red and said second hue is substantially cyan.

7. A color display system as set forth in claim 5 wherein said phosphor material emits light of a third hue when energized by electrons having energies above a second predetermined level, said second predetermined level being higher than said first level.

8. A color display system as set forth in claim 7 wherein said first hue is substantially red, said second hue is substantially green and said third hue is substantially blue.

9. A color display system as set forth in claim 2 wherein said means for scanning said screen to produce light at spaced points includes gate means and means for controlling said gate means to pass each of said signals at predetermined points in respective scan lines.

10. A color display system as set forth in claim 9 wherein said means for controlling said gate means includes a field counter which is advanced at the start of the scanning of each field, a line counter which is advanced at the start of the scanning of each line, a dot counter, and means for advancing said dot counter at a frequency substantially higher than the line scan frequency.

11. A color display system as set forth in claim 10 wherein said means for advancing said dot counter comprises an oscillator.

12. A color display system for producing color images from a plurality of signals corresponding to different respective hues, said system comprising:
- a viewing screen which emits light of different colors when struck by electrons having different energies;
- an electron gun for emitting a beam of electrons toward said screen;
- means for scanning said beam over said screen in a series of substantially parallel lines;
- means for applying an electron acceelrating voltage to said screen, said voltage applying means including means for changing said voltage on successive lines during each scan of the series of lines to produce light of different hues on alternate lines, the voltage applied during the scanning of each line being alternated on successive scans of each line to produce light of different hues on each line on successive scans; and
- means for applying a respective one of said signals to said gun at predetermined points during the scanning of each line thereby to produce a series of spaced dots of light the brightnesses of which are varied in accordance with said respective signal as light of the respective hue is produced, the spaced dots being at alternate positions on each line during alternate scans.

References Cited

UNITED STATES PATENTS

| | | | |
|---|---|---|---|
| 2,680,778 | 6/1954 | Werenfels et al. | |
| 2,698,355 | 12/1954 | Sleeper. | |
| 2,747,013 | 5/1956 | Sleeper et al. | 178—5.4 |
| 3,204,143 | 8/1965 | Pritchard. | |

RICHARD MURRAY, Primary Examiner

U.S. Cl. X.R.

178—5.2